(12) United States Patent
Kitamura et al.

(10) Patent No.: US 10,092,923 B2
(45) Date of Patent: Oct. 9, 2018

(54) AUTOMATIC PRODUCTION SYSTEM

(71) Applicant: KAWASAKI JUKOGYO KABUSHIKI KAISHA, Kobe-shi, Hyogo (JP)

(72) Inventors: Shinji Kitamura, Kako-gun (JP); Ryo Taniuchi, Nishinomiya (JP); Nobuhiro Demura, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/534,673

(22) PCT Filed: Nov. 30, 2015

(86) PCT No.: PCT/JP2015/083611
§ 371 (c)(1),
(2) Date: Jun. 9, 2017

(87) PCT Pub. No.: WO2016/093097
PCT Pub. Date: Jun. 16, 2016

(65) Prior Publication Data
US 2017/0341099 A1 Nov. 30, 2017

(30) Foreign Application Priority Data
Dec. 9, 2014 (JP) .................. 2014-248599

(51) Int. Cl.
*B05B 3/00* (2006.01)
*B05B 15/12* (2006.01)
*B05B 13/04* (2006.01)
*B25J 9/06* (2006.01)
*B25J 11/00* (2006.01)
*B05B 16/00* (2018.01)

(52) U.S. Cl.
CPC .......... *B05B 13/0452* (2013.01); *B05B 16/00* (2018.02); *B25J 9/06* (2013.01); *B25J 11/0075* (2013.01)

(58) Field of Classification Search
USPC ........................... 118/323, 321, 326; 901/43
See application file for complete search history.

(56) References Cited

U.S. PATENT DOCUMENTS

| 4,920,500 A | 4/1990 | Hetland et al. |
| 5,887,430 A | 3/1999 | Hirai et al. |
| (Continued) | | |

FOREIGN PATENT DOCUMENTS

| CA | 2497250 A1 | 8/2006 |
| JP | S63-502783 A | 10/1988 |
| (Continued) | | |

OTHER PUBLICATIONS

Jan. 12, 2016 Search Report issued in International Patent Application No. PCT/JP2015/083611.

*Primary Examiner* — Yewebdar T Tadesse
(74) *Attorney, Agent, or Firm* — Oliff PLC (57) ABSTRACT

This system has an articulated robot having an arm and a base portion which rotatably supports the arm; and a rotation positioner to which the base portion of the articulated robot is mounted. A turn axis of the base portion of the articulated robot is orthogonal to a rotation axis of the rotation positioner. Thus, interference of a workpiece with the arm can be avoided and flexibility of works performed by the robot can be expanded.

7 Claims, 8 Drawing Sheets

(56) References Cited

U.S. PATENT DOCUMENTS 8,627,780 B2 * 1/2014 Herre .................. B05B 13/0431
                                                                                118/323
2012/0312862 A1 12/2012 Landoll et al.

FOREIGN PATENT DOCUMENTS

| JP | H05-317762 A | 12/1993 |
|----|--------------|---------|
| JP | H07-40266 A  | 2/1995  |

* cited by examiner

FIG. 8

AUTOMATIC PRODUCTION SYSTEM

TECHNICAL FIELD

The present invention relates to an automatic production system comprising an articulated robot such as a coating robot.

BACKGROUND ART

Recently, automatic production systems are widely implemented, wherein various works which were conventionally performed by workers are performed by robots instead so as to automate production process. One of such automatic production systems is an automatic production system for coating for applying coating on a workpiece such as an automobile body.

In the automatic production system for coating, a coating robot is arranged inside a coating booth, where coating liquid is jetted from a coating gun mounted to an arm distal end of the coating robot to the automobile body carried in the coating booth. In one automatic production system for coating, the automobile body is moved by a conveyer inside the coating booth, and in another automatic production system for coating, the coating robot itself is made to travel along a rail inside the coating booth.

CITATION LIST

Patent Document

[Patent Document 1] Japanese Patent Application Laid-Open No. H05-317762

SUMMARY OF INVENTION

Objects to be Achieved by the Invention

However, in the conventional automatic production system for coating, sometimes the arm of the coating robot interferes with a workpiece depending on the position of a coated object of a workpiece and its surroundings' shape, and thus it is difficult to arrange the coating gun in a desired position/posture. This problem is possible to occur also in an articulated robot in an automatic production system for performing works other than coating.

Additionally, it is needed to expand a reachable range of the arm in a vertical direction in order to perform works such as coating and the like to a workpiece having a large dimension in the vertical direction. However, in the conventional automatic production system where the robot is made to travel along the travelling rail, the arm reachable range in a horizontal direction can be expanded, while the arm reachable range in the vertical direction cannot be expanded.

Additionally, since a cable for supplying coating liquid to the coating robot is generally strengthened by a metal protective member or the like for satisfying a predetermined explosion-proof standard, it is relatively large in diameter and heavy. Moreover, since the coating liquid is supplied to the coating robot by a harness composed of a plurality of cables, there is a problem that installing the harness which is heavy and bulky is difficult.

Note that, also in the robot used for applications other than coating, a problem of the above-stated difficulty in harness installation is possible to occur when treatment liquid or the like needs to be continuously supplied via the harness to the end effector mounted on the arm distal end.

The present invention is made considering the above-stated problems of the conventional technique, and its object is to provide an automatic production system capable of avoiding interference of the workpiece with the arm and expanding degree of freedom (flexibility) of works performed by the robot.

Additionally, an object of the present invention is to provide an automatic production system capable of expanding the arm reachable range in the vertical direction.

Additionally, an object of the present invention is to provide an automatic production system capable of installing the harness connected to the robot without difficulty.

Means for Achieving the Objects

In order to achieve the objects above, an automatic production system according to a first aspect of the present invention comprises: an articulated robot having an arm and a base portion which rotatably supports the arm; and a rotation positioner to which the base portion of the articulated robot is mounted, wherein a turn axis of the base portion of the articulated robot is orthogonal to a rotation axis of the rotation positioner.

An automatic production system according to a second aspect of the present invention is that, in the first aspect, the rotation axis of the rotation positioner is oriented in a horizontal direction, and the rotation positioner can rotate the base portion of the articulated robot about the rotation axis so as to vertically reverse an orientation of the turn axis of the base portion of the articulated robot.

An automatic production system according to a third aspect of the present invention is that, in the first or second aspect, the rotation positioner has a rotary portion to which the base portion of the articulated robot is mounted and a fixed portion which rotatably supports the rotary portion, and the fixed portion of the rotation positioner is configured to support a harness connected to the articulated robot.

An automatic production system according to a fourth aspect of the present invention is that, in the third aspect, the harness is fixed to a harness fixing member which rotates integrally with the rotary portion of the rotation positioner, and the fixed portion of the rotation positioner is configured to support the harness which moves along with a rotation of the rotary portion of the rotation positioner.

An automatic production system according to a fifth aspect of the present invention is that, in the third or fourth aspect, the harness is arranged in a direction substantially orthogonal to the rotation axis of the rotation positioner around the fixed portion of the rotation positioner.

An automatic production system according to a sixth aspect of the present invention further comprises, in any one of the first to fifth aspects, a traveling unit having a moving portion, wherein the rotation positioner is mounted to the moving portion of the traveling unit, and wherein the rotation axis of the rotation positioner is oriented in a direction orthogonal to a traveling direction of the moving portion.

An automatic production system according to a seventh aspect of the present invention is that, in the sixth aspect, a harness hanging member for hanging and supporting the harness is provided to the moving portion of the traveling unit, and the harness loosened due to a rotational movement of the rotation positioner hangs down between the harness hanging member and the rotation positioner.

An automatic production system according to an eighth aspect of the present invention further comprises, in the seventh aspect, a working building having a working region for the articulated robot thereinside, wherein the traveling unit is installed adjacent to a side wall such that a traveling direction of the moving portion is substantially parallel to the side wall of the working building, and wherein a part of the harness extending from the harness hanging member to the rotation positioner is substantially within a width region of an installation space of the traveling unit and the rotation positioner.

An automatic production system according to a ninth aspect of the present invention is that, in any one of the first to eighth aspects, the articulated robot is a six-axis articulated robot.

An automatic production system according to a tenth aspect of the present invention is that, in any one of the first to ninth aspects, the articulated robot is a coating robot.

Effect of the Invention

According to the present invention, in an automatic production system comprising an articulated robot, interference of a workpiece with an arm can be avoided and degree of freedom (flexibility) of works performed by the robot can be expanded.

Additionally, according to the present invention, in the automatic production system comprising the articulated robot, an arm reachable range in the vertical direction can be expanded.

Additionally, according to the present invention, in the automatic production system comprising the articulated robot, a harness connected to the robot can be installed without difficulty.

EMBODIMENT OF THE INVENTION

Hereunder, one embodiment of an automatic production system according to the present invention will be described referring to the drawings.

Note that, the automatic production system according to this embodiment is used for coating an automobile body or the like. However, the automatic production system according to the present invention is not limited to coating application, and other than coating, it is applicable to various works such as assembly and machining of workpieces.

As illustrated in FIGS. 1 to 4, an automatic production system 1 for coating according to this embodiment comprises a traveling unit 2, and this traveling unit 2 has a moving portion 4 which can travel along a rail 3. The rail 3 of the traveling unit 2 is extended in the horizontal direction and supported by a plurality of column members 5 at a predetermined height position from a floor surface. The height position of the rail 3 is set to the vicinity of a center position in a vertical dimension of a workpiece to be coated, for example.

A rotation positioner 6 is mounted to the moving portion 4 of the traveling unit 2. A rotation axis JT7 of the rotation positioner 6 is extended in a first horizontal direction D1, and this first horizontal direction D1 is orthogonal to a second horizontal direction D2 which is a traveling direction of the moving portion 4 of the traveling unit 2.

The rotation positioner 6 has a fixed position 7 which is fixed to the moving portion 4 of the traveling unit 2, and a rotary portion 8 which is supported by this fixed portion 7 so as to rotate about the rotation axis JT7. A base portion 10 of an articulated robot 9 is mounted to the rotary portion 8 of the rotation positioner 6. The articulated robot 9 comprises an arm 11 supported by the base portion 10 so as to turn about a turn axis JT1. The arm 11 has five joints' axes JT2~JT6, and the articulated robot 9 has six axes JT1~JT6 including the turn axis JT1. A coating gun (not illustrated) as an end effector is mounted on a distal end of the arm 11, and coating liquid is jetted from the coating gun toward a workpiece such as an automobile body or the like.

In the automatic production system 1 according to this embodiment, the turn axis JT1 of the base portion 10 of the articulated robot 9 is orthogonal to the rotation axis JT7 of the rotation positioner 6.

Figure 5:
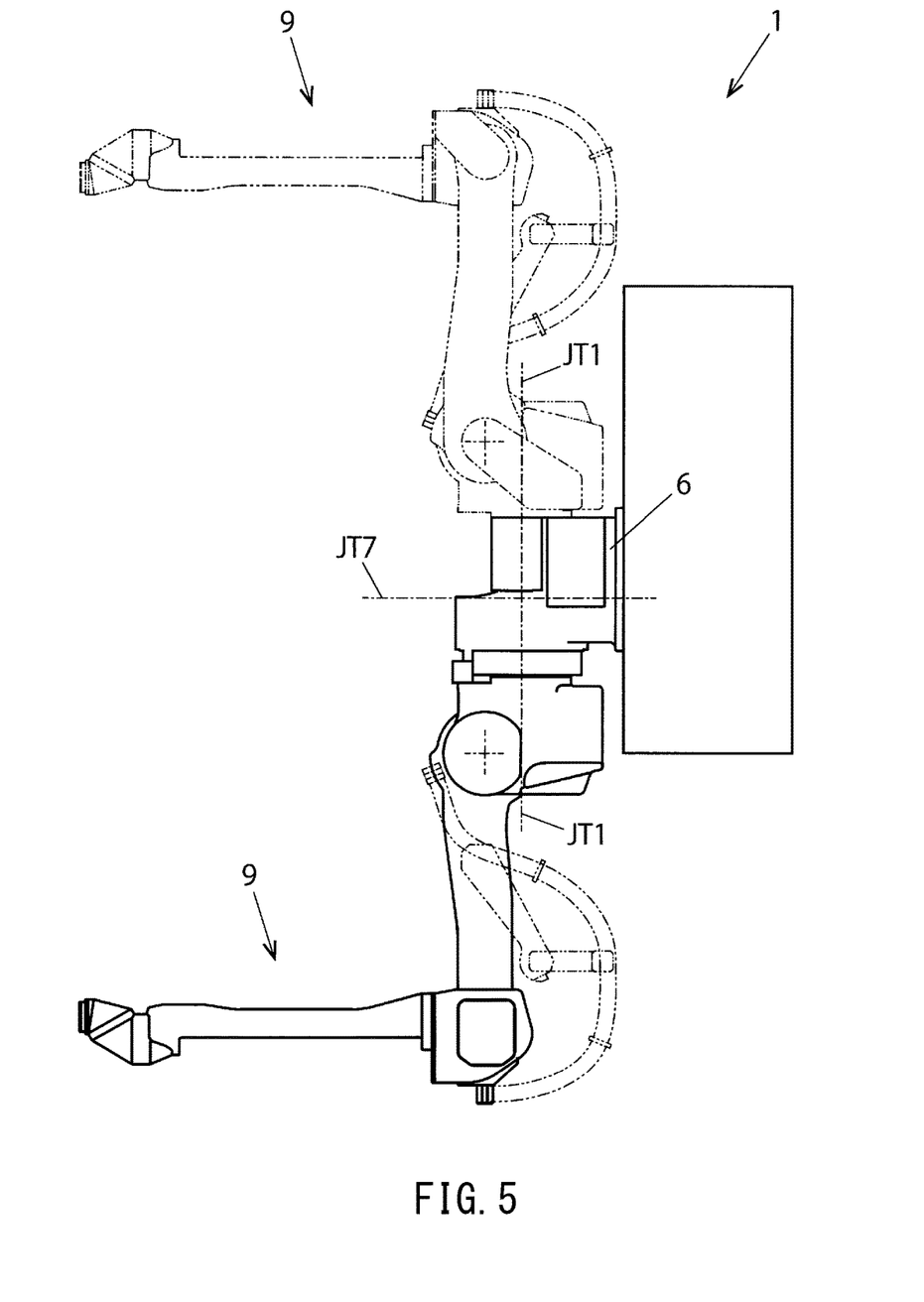
FIG. 5 is a figure illustrating a vertical arrangement of a robot in the automatic production system in FIG. 1.

Additionally, the rotation positioner 6 can rotate the articulated robot 9 so that the turn axis JT1 of the base portion 10 of the articulated robot 9 is rotated exceeding the above-mentioned second horizontal direction (extending direction of rail) D2. Thus, as illustrated in FIG. 5, the articulated robot 9 is rotated about the rotation axis JT7 of the rotation positioner 6 by driving the rotation positioner 6 so that the direction of the turn axis JT1 of the base portion 10 of the articulated robot 9 can be vertically reversed.

The automatic production system 1 according to this embodiment comprises a control unit (not illustrated), and the traveling unit 2, the rotation positioner 6, and the articulated robot 9 are cooperatively controlled by this control unit. Preferably, the control unit consists of a robot controller, and the traveling unit 2 and the rotation positioner 6 are controlled by the control unit as an external axis of the robot 9.

Figure 1:
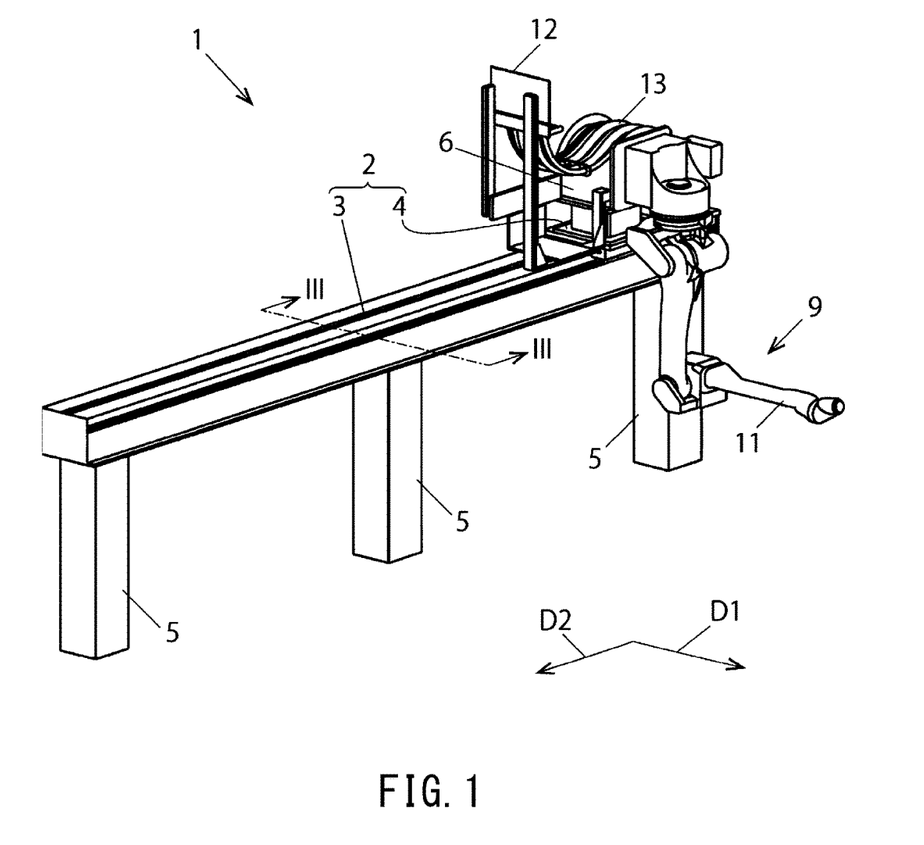
FIG. 1 is a perspective view illustrating a schematic configuration of an automatic production system according to one embodiment of the present invention.
Figure 2:
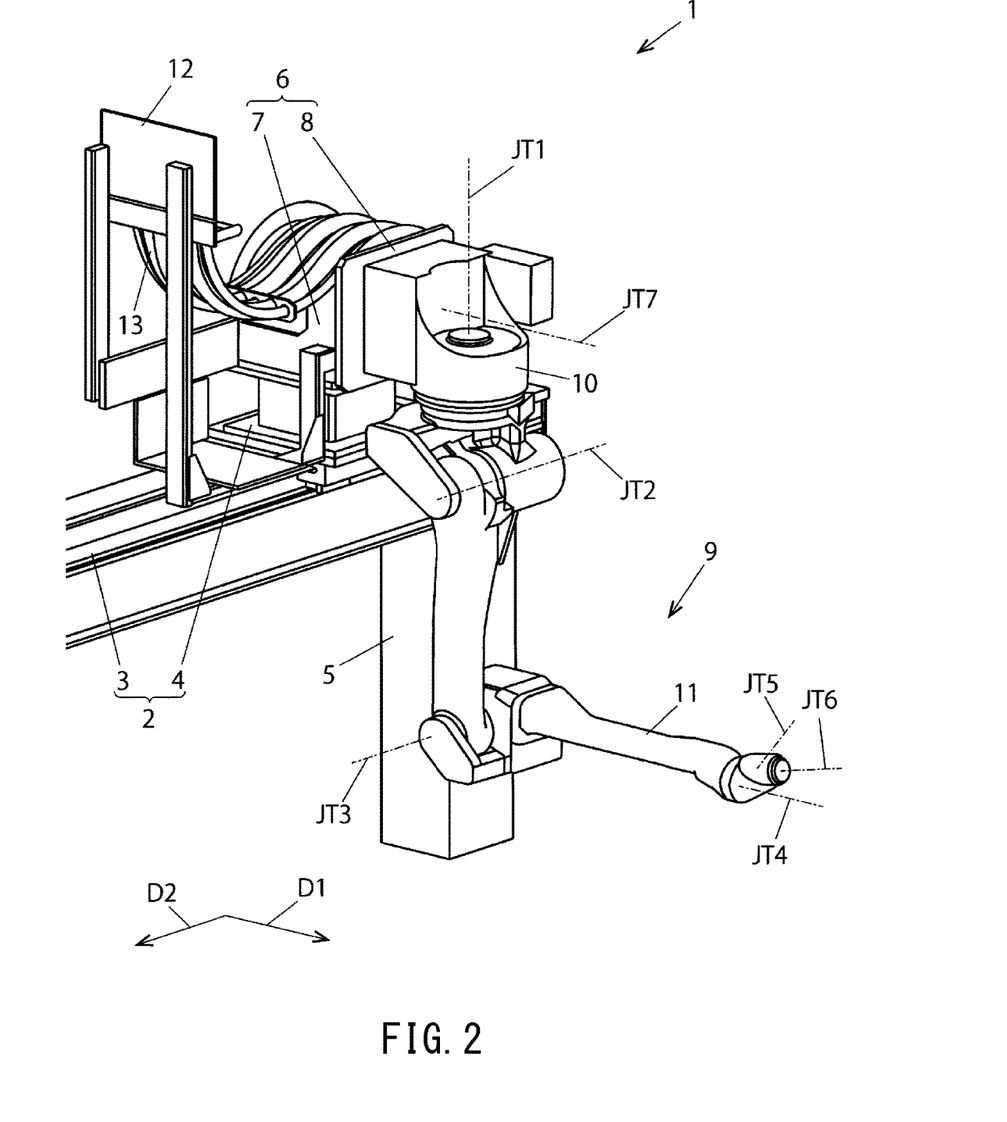
FIG. 2 is a perspective view illustrating an enlarged main portion of the automatic production system in FIG. 1.
Figure 3:
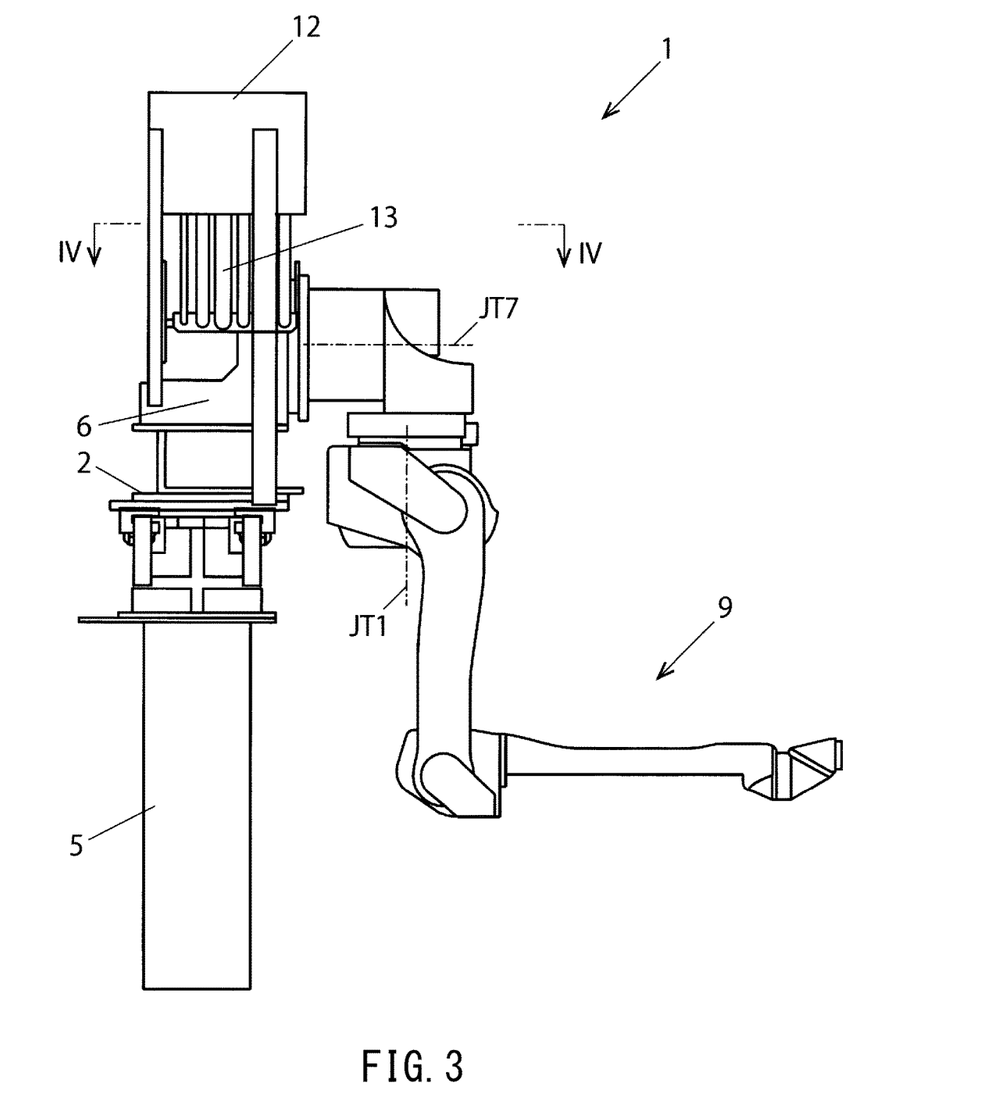
FIG. 3 is a figure viewed from the arrow III-III of the automatic production system in FIG. 1.
Figure 4:
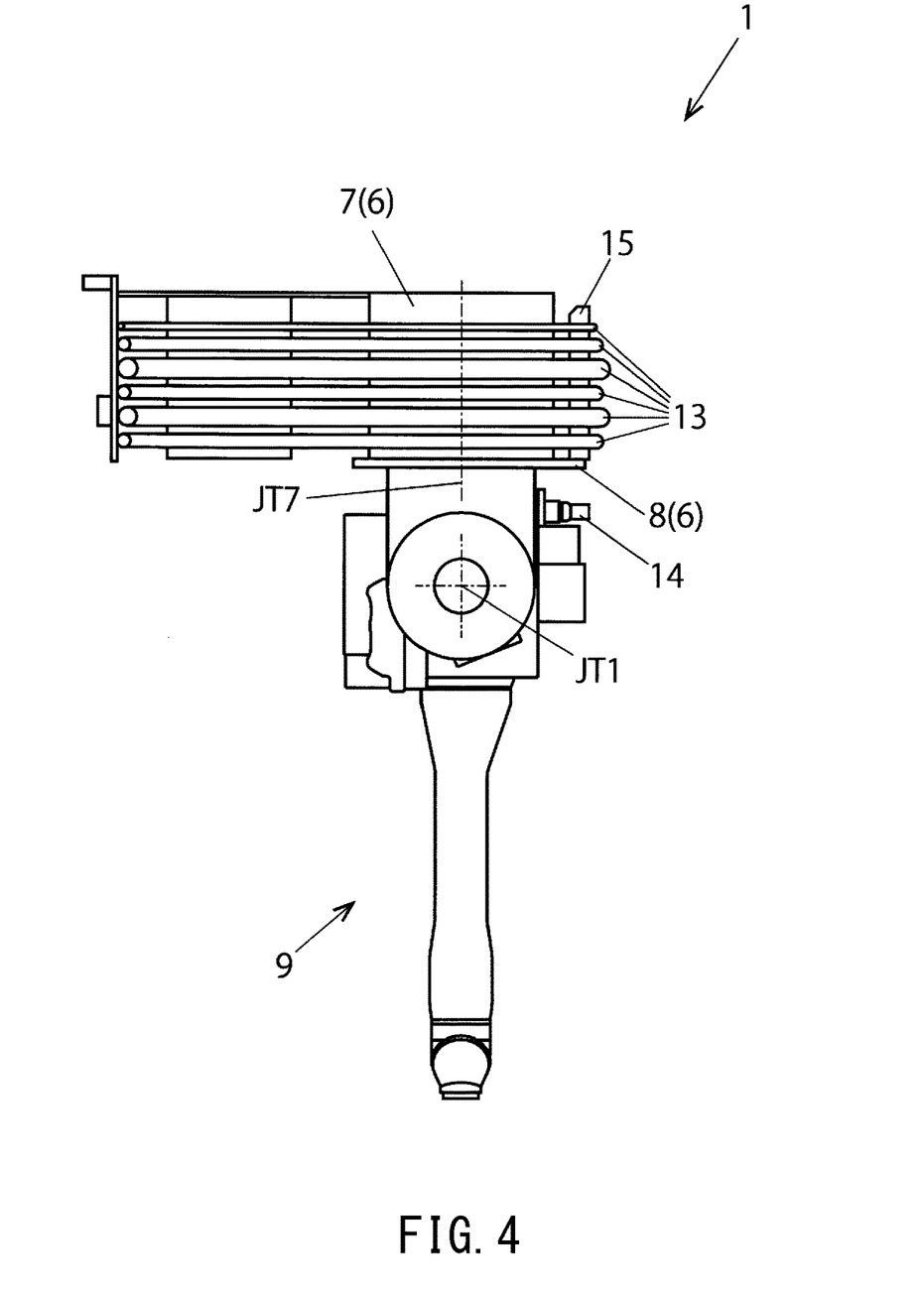
FIG. 4 is a figure viewed from the arrow IV-IV of the automatic production system in FIG. 3.

As best illustrated in FIG. 2, a harness hanging member 12 is provided to the moving portion 4 of the traveling unit 2, and a harness 13 composed of a plurality of cables for supplying coating liquid to the robot 9 is hung and supported by the harness hanging member 12. The harness 13 is arranged in a direction substantially orthogonal to the rotation axis JT7 of the rotation positioner 6 around the fixed portion 7 of the rotation positioner 6.

Each distal end portion of a plurality of cables configuring the harness 13 is connected to each port 14 (FIG. 4) formed on the base portion 10 of the robot 9. A harness fixing member 15 which is rotated integrally with the rotary portion 8 is provided to the rotary portion 8 of the rotation positioner 6, and the harness 13 is fixed to this harness fixing member 15.

The fixed portion 7 of the rotation positioner 6 is configured to support the harness 13 connected to the base portion 10 of the robot 9. Specifically, the fixed portion 7 of the rotation positioner 6 is configured to support the harness 13 which moves along with the rotation of the rotary portion 8 of the rotation positioner 6.

Figure 6:
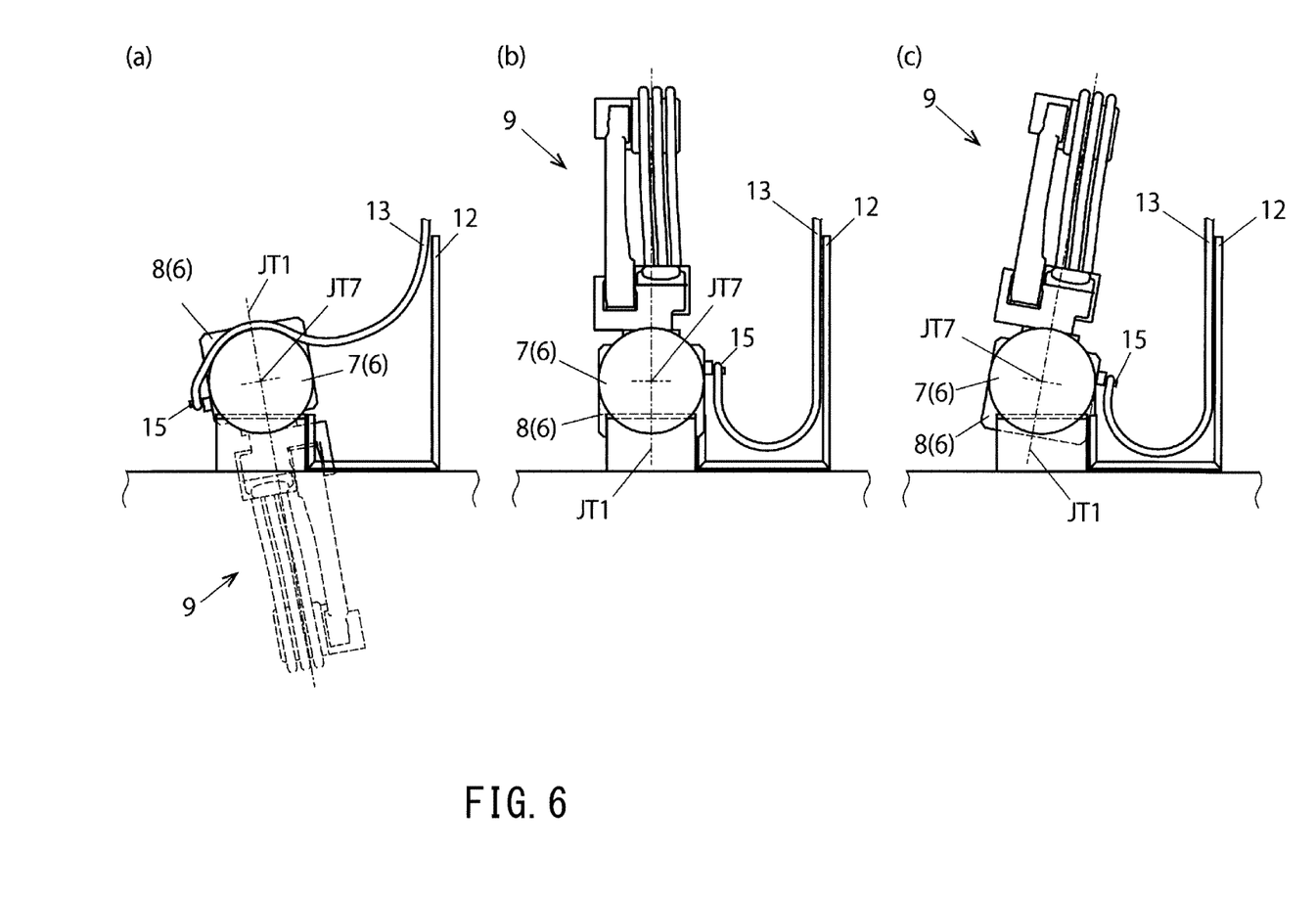
FIG. 6 is a figure illustrating a rotation movement of the robot about a rotation axis JT7 of a rotation positioner: (a) illustrates a case when a rotation angle of JT7 is +10 degrees, (b) illustrates a case when the rotation angle of JT7 is −180 degrees, and (c) illustrates a case when the rotation angle of JT7 is −190 degrees.

FIG. 6 illustrates a change state when the robot 9 is rotated about the rotation axis JT7 of the rotation positioner 6. FIG. 6(a) illustrates a state that a rotation angle of the rotation positioner 6 is +10 degrees.

Here, the rotation angle of the rotation positioner 6 is a rotation angle of the rotary portion 8 about the rotation axis JT7. This rotation angle defines a state that the turn axis JT1 of the base portion 10 of the robot 9 is oriented in a vertical direction when the robot 9 is oriented downward as 0 degree, and the counterclockwise rotation is plus and the clockwise rotation is minus in FIG. 6.

In the state illustrated in FIG. 6(a), the harness 13 fixed to the harness fixing member 15 is pulled in along with the counterclockwise rotational movement of the rotation positioner 6. The harness 13 pulled in is supported by a side circumferential surface of the fixed portion 7 of the rotation positioner 6.

When the rotary portion 8 of the rotation positioner 6 is rotated in the clockwise direction from the state illustrated in FIG. 6(a) so as to make the robot 9 oriented upward, the pulled in state of the harness 13 is released and harness 13 is loosened as illustrated in FIG. 6(b), (c). The harness 13 loosened along with the rotational movement of the rotation positioner 6 hangs down between the harness hanging member 12 and the rotation positioner 6.

Figure 7:
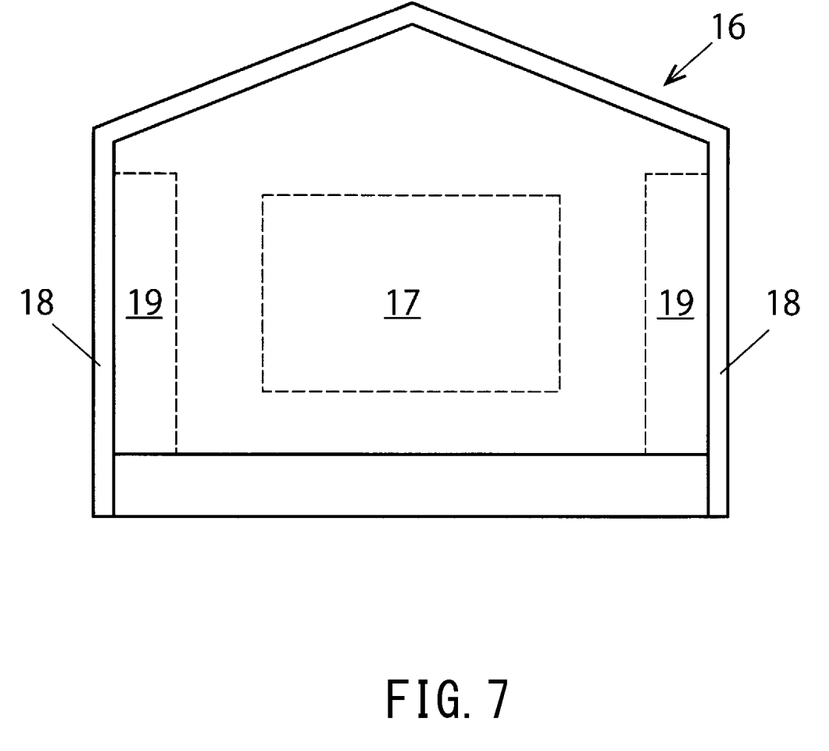
FIG. 7 is a schematic longitudinal section view illustrating a situation in a coating booth where the automatic production system in FIG. 1 is installed.
Figure 8:
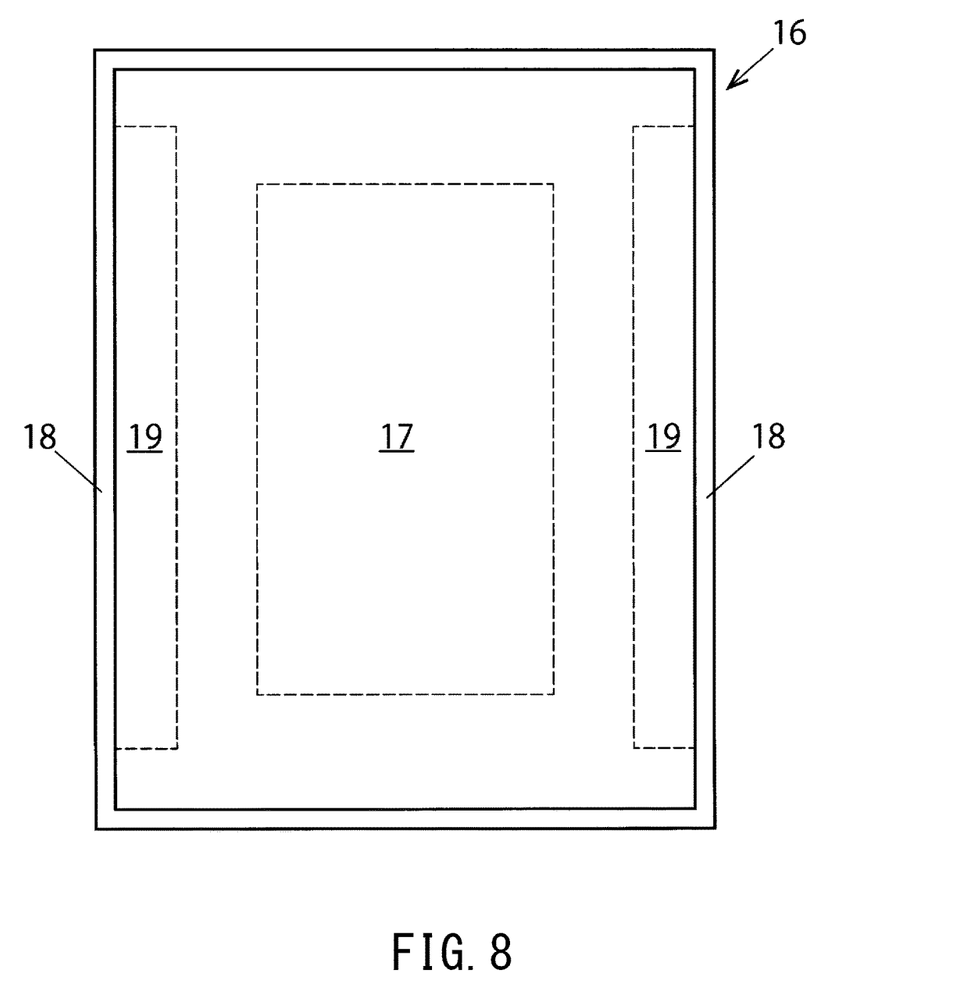
FIG. 8 is a schematic cross section view illustrating a situation in the coating booth where the automatic production system in FIG. 1 is installed.

FIG. 7 and FIG. 8 are figures illustrating a situation in a coating booth (working building) 16 where the automatic production system 1 according to this embodiment is installed. A center part of the coating booth 16 forms a working region 17, and coating work of workpieces is performed inside this working region 17.

The traveling unit 2 of the automatic production system 1 according to this embodiment is installed in an installation space 19 adjacent to a side wall 18 such that a traveling direction of the moving portion 4 is substantially parallel to the side wall 18 of the coating booth 16. Thus, the traveling unit 2 and the rotation positioner 6 are within a width region of the installation space 19. Additionally, a part of the harness 13 extending from the harness hanging member 12 to the rotation positioner 6 is also within the width region of the installation space 19 of the traveling unit 2 and the rotation positioner 6.

Note that, although the six-axis articulated robot 6 is used as a working robot in the above-stated embodiment, a robot which can be used in the automatic production system according to the present invention is not limited to the six-axis articulated robot, and thus various articulated robots having a turn axis at a base portion can be used.

As stated above, in the automatic production system 1 according to this embodiment, the orientation of the turn axis JT1 of the base portion 10 of the articulated robot 9 can be controlled by the rotation positioner 6, and therefore flexibility of position/posture of the arm 11 for avoiding interference with a workpiece to be coated can be enhanced when driving the arm 11 of the robot 9 so as to move a coating gun (end effector) to a desired position/posture.

Additionally, in the automatic production system 1 according to this embodiment, the orientation of the turn axis JT1 of the base portion 10 of the articulated robot 9 can be reversed vertically by the rotation positioner 6, and therefore the arm reachable range in the vertical direction can be expanded. Thereby, coating work can be performed without difficulty to a workpiece having a large dimension in the vertical direction.

Additionally, in the automatic production system 1 according to this embodiment, the articulated robot 9 can be moved in the horizontal direction integrally with the rotation positioner 6 by the traveling unit 2, and therefore the arm reachable range in the horizontal direction can be expanded.

Additionally, in the automatic production system 1 according to this embodiment, the harness 13 connected to the articulated robot 9 can be supported by the fixed portion 7 of the rotation positioner 6, and therefore the heavy and bulky harness 13 such as a coating harness 13 can be installed without difficulty.

Particularly, since the harness 13 moving along with the movement of the rotary portion 8 of the rotation positioner 6 can be supported by the fixed portion 7 of the rotation positioner 6, the moving harness 13 can be prevented from interfering with surrounding structures and also load of the harness weight on the rotation positioner 6 can be reduced.

Additionally, since the harness 13 which is loosened due to the rotational movement of the rotation positioner 6 is configured to hang down between the harness hanging member 12 and the rotation positioner 6, the moving harness 13 can be within a compact space.

Additionally, in the automatic production system 1 according to this embodiment, since the part of the harness 13 extending from the harness hanging member 12 to the rotation positioner 6 is within the width region of the installation space 19 of the traveling unit 2 and the rotation positioner 6, the entire system can be installed in the limited installation space 19 inside the coating booth 16 without difficulty.

DESCRIPTION OF REFERENCE NUMERALS

1 . . . automatic production system
2 . . . traveling unit
3 . . . rail of traveling unit
4 . . . moving portion of traveling unit
5 . . . column member
6 . . . rotation positioner
7 . . . fixed portion of rotation positioner
8 . . . rotary portion of rotation positioner
9 . . . articulated robot
10 . . . base portion of articulated robot
11 . . . arm of articulated robot
12 . . . harness hanging member
13 . . . harness
14 . . . port
15 . . . harness fixing member
16 . . . coating booth
17 . . . working region
18 . . . side wall of coating booth
19 . . . installation space of automatic production system

The invention claimed is:
1. An automatic production system, comprising:
an articulated robot having an arm and a base portion which rotatably supports the arm; and
a rotation positioner to which the base portion of the articulated robot is mounted, wherein a turn axis of the base portion of the articulated robot is orthogonal to a rotation axis of the rotation positioner, wherein the rotation positioner has a rotary portion to which the base portion of the articulated robot is mounted, and a fixed portion which rotatably supports the rotary portion, wherein the fixed portion of the rotation positioner is configured to support a harness connected to the articulated robot, wherein the harness is arranged in a direction substantially orthogonal to the rotation axis of the rotation positioner around the fixed portion of the rotation positioner, wherein the automatic production system further comprises a traveling unit having a moving portion, wherein the rotation positioner is mounted to the moving portion of the traveling unit, and wherein the rotation axis of the rotation positioner is oriented in a direction orthogonal to a traveling direction of the moving portion.

2. The automatic production system according to claim 1, wherein the rotation axis of the rotation positioner is oriented in a horizontal direction, and wherein the rotation positioner can rotate the base portion of the articulated robot about the rotation axis so as to vertically reverse an orientation of the turn axis of the base portion of the articulated robot.

3. The automatic production system according to claim 1, wherein the harness is fixed to a harness fixing member which rotates integrally with the rotary portion of the rotation positioner, and wherein the fixed portion of the rotation positioner is configured to support the harness which moves along with a rotation of the rotary portion of the rotation positioner.

4. The automatic production system according to claim 1, wherein a harness hanging member for hanging and supporting the harness is provided to the moving portion of the traveling unit, and wherein the harness loosened due to a rotational movement of the rotation positioner hangs down between the harness hanging member and the rotation positioner.

5. The automatic production system according to claim 4, further comprising a working building having a working region for the articulated robot thereinside, wherein the traveling unit is installed adjacent to a side wall of the working building such that a traveling direction of the moving portion is substantially parallel to the side wall, and wherein a part of the harness extending from the harness hanging member to the rotation positioner is substantially within a width region of an installation space of the traveling unit and the rotation positioner.

6. The automatic production system according to claim 1, wherein the articulated robot is a six-axis articulated robot.

7. The automatic production system according to claim 1, wherein the articulated robot is a coating robot.

* * * * *